United States Patent
Miller

Patent Number: 6,046,883
Date of Patent: *Apr. 4, 2000

[54] HEAD SUSPENSION HAVING A FLEXURE MOTION LIMITER

[75] Inventor: Mark A. Miller, Hutchinson, Minn.

[73] Assignee: Hutchinson Technology Incorporated, Hutchinson, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/997,154

[22] Filed: Dec. 23, 1997

Related U.S. Application Data

[60] Provisional application No. 60/034,798, Dec. 31, 1996, abandoned.

[51] Int. Cl.$^7$ .................................... G11B 5/48
[52] U.S. Cl. ............................................ 360/104
[58] Field of Search .................................. 360/103, 104

[56] References Cited

U.S. PATENT DOCUMENTS

| | | | |
|---|---|---|---|
| 3,349,384 | 10/1967 | Kohn | 360/104 |
| 3,665,434 | 5/1972 | Applequist et al. | 29/603.06 |
| 3,713,121 | 1/1973 | Fasano et al. | 340/174.1 E |
| 4,204,235 | 5/1980 | Stollarz . | |
| 4,206,489 | 6/1980 | Manzke et al. . | |
| 4,208,684 | 6/1980 | Jansen et al. | 360/104 |
| 4,447,493 | 5/1984 | Driscoll et al. | 428/332 |
| 4,700,250 | 10/1987 | Kuriyama | 29/603.06 |
| 4,724,500 | 2/1988 | Dalziel . | |
| 4,760,478 | 7/1988 | Pal et al. | 360/104 |
| 4,777,551 | 10/1988 | Seki et al. | 360/104 |
| 4,807,070 | 2/1989 | Isozaki et al. . | |
| 4,819,094 | 4/1989 | Oberg | 360/104 |
| 4,905,111 | 2/1990 | Tuma et al. | 360/126 |
| 4,939,611 | 7/1990 | Connolly | 360/104 |

(List continued on next page.)

FOREIGN PATENT DOCUMENTS

| | | |
|---|---|---|
| 0 121 057 | 10/1984 | European Pat. Off. . |
| 0 617 411 A2 | 3/1994 | European Pat. Off. . |
| 56-19554 | 2/1981 | Japan . |
| 57-105860 | 7/1982 | Japan . |
| 60-167172 | 8/1985 | Japan ................................ 360/104 |
| 62-097168 | 5/1987 | Japan . |
| 62-145583 | 6/1987 | Japan ................................ 360/104 |
| 62-231462 | 10/1987 | Japan ................................ 360/104 |
| 1-62876 | 3/1989 | Japan . |
| 1-70977 | 3/1989 | Japan ................................ 360/104 |
| 2-44563 | 2/1990 | Japan ................................ 360/104 |
| 8203190 | 8/1996 | Japan . |
| 9-134577 | 5/1997 | Japan . |
| WO 92/05542 | 4/1992 | WIPO ................................ 360/104 |
| WO 97/21212 | 6/1997 | WIPO . |

*Primary Examiner*—William J. Klimowicz
*Attorney, Agent, or Firm*—Faegre & Benson LLP

[57] ABSTRACT

A head suspension for supporting a head slider over a disk surface within a rigid disk drive includes a load beam with a flexure at a distal end of the load beam. The head suspension includes motion limiters for restricting the range of motion of the flexure relative to the load beam. Toward this end, the load beam of the present invention includes a plurality of limit elements, each limit element having an engagement surface, and the flexure includes a corresponding plurality of engagement tabs, each engagement tab having a stop surface opposite the engagement surface of one of the limit elements. The limit elements are connected with the load beam by one or more bends to operatively receive the engagement tabs of the flexure. In one embodiment of the present invention, the limit elements are "L" shaped appendages that are first etched to extend transversely from the load beam, and are then bent along a longitudinal bend by an angle of about 90° to position the engagement surface of the limit element beneath the stop surface of a corresponding engagement tab. In a second embodiment, the limit elements include an opening, each limit element being bent by an angle of about 90° to orient the opening of the limit element in such a manner that the engagement tabs of the flexure are received by the limit elements.

18 Claims, 8 Drawing Sheets

U.S. PATENT DOCUMENTS

| | | | |
|---|---|---|---|
| 4,943,881 | 7/1990 | Isozaki et al. . | |
| 5,012,369 | 4/1991 | Owe et al. . | |
| 5,079,660 | 1/1992 | Yumura et al. | 360/104 |
| 5,118,562 | 6/1992 | Johnson et al. | 428/327 |
| 5,185,683 | 2/1993 | Oberg et al. | 360/104 |
| 5,187,625 | 2/1993 | Blaeser et al. . | |
| 5,299,081 | 3/1994 | Hatch et al. | 360/154 |
| 5,329,504 | 7/1994 | Mukawa | 369/75.2 |
| 5,333,085 | 7/1994 | Prentice et al. | 360/104 |
| 5,353,181 | 10/1994 | Frater et al. | 360/104 |
| 5,367,419 | 11/1994 | Kazama | 360/103 |
| 5,428,490 | 6/1995 | Hagen | 360/104 |
| 5,491,597 | 2/1996 | Bennin et al. | 360/104 |
| 5,526,205 | 6/1996 | Aoyagi et al. | 360/104 |
| 5,530,606 | 6/1996 | Baasch et al. | 360/104 |
| 5,535,075 | 7/1996 | Takahashi et al. . | |
| 5,572,387 | 11/1996 | Brooks, Jr. et al. | 360/104 |
| 5,612,841 | 3/1997 | Johnson | 360/104 |
| 5,640,290 | 6/1997 | Khanna et al. | 360/105 |
| 5,682,279 | 10/1997 | Imasaki | 360/104 |
| 5,734,526 | 3/1998 | Symons | 360/104 |
| 5,771,135 | 6/1998 | Ruiz et al. | 360/104 |
| 5,771,136 | 6/1998 | Girard | 360/104 |
| 5,815,349 | 9/1998 | Frater | 360/104 |
| 5,838,517 | 11/1998 | Frater . | |
| 5,877,920 | 3/1999 | Resh | 360/104 |

HEAD SUSPENSION HAVING A FLEXURE MOTION LIMITER

This application claims the benefit of U.S. Provisional Application No. 60/034,798, filed Dec. 31, 1996, now abandoned.

TECHNICAL FIELD

The present invention is directed generally to a head suspension for supporting a head slider relative to a rotating disk in a rigid disk drive. More particularly, the invention is a head suspension having a flexure motion limiter.

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides forces and compliances necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk which is referred to as the "fly height."

Head suspensions for rigid disk drives include a load beam and a flexure. The load beam includes a mounting region at its proximal end for mounting the head suspension to an actuator of the disk drive, a rigid region, and a spring region between the mounting region and the rigid region for providing a spring force to counteract the aerodynamic lift force generated on the head slider during the drive operation as described above. The flexure includes a gimbal region having a slider mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

In one type of head suspension the flexure is formed as a separate piece having a load beam mounting region which is rigidly mounted to the distal end of the load beam using conventional methods such as spot welds. Head suspensions of this type typically include a load point dimple formed in either the load beam or the gimbal region of the flexure. The load point dimple transfers portions of the load generated by the spring region of the load beam to the flexure, provides clearance between the flexure and the load beam, and serves as a point about which the head slider can gimbal in pitch and roll directions to follow fluctuations in the disk surface.

As disk drives are designed having smaller disks, closer spacing, and increased storage densities, smaller and thinner head suspensions are required. These smaller and thinner head suspensions are susceptible to damage if the disk drive is subjected to a shock load or if the suspension experiences excessive pitch and roll motion. Moreover, as the use of portable personal computers increases, it is more likely that head suspensions in these portable computers will be subjected to shock loads. Thus, it is becoming increasingly important to design the head suspension so that it is less susceptible to excessive movements caused by shock loads and by pitch and roll motion. In this manner, damaging contact between the head slider and the disk surface and permanent deformation of components of the head suspension can be prevented.

Mechanisms have been developed for limiting the movement of a free end of a cantilever portion of a flexure for protection against damage under shock loads. One such mechanism is disclosed in U.S. Pat. No. 4,724,500 to Dalziel. The Dalziel reference describes a limiter structure comprising a head slider having raised shoulders to which one or more elements are secured. The elements on the head slider overlap at least a portion of a top surface of the load beam to which the flexure is attached. The Dalziel structure is rather complicated in that an assembly of components is required, including a modified head slider having raised shoulders and limiter elements. These structures add to the weight, height and difficulty of manufacture and assembly of the head suspension. The added structure would be particularly undesirable in the design of smaller head suspension.

Another motion limiter is disclosed in U.S. Pat. No. 5,333,085 to Prentice et al. The Prentice head suspension includes a tab that extends from a free end of a cantilever portion of a flexure. The tab is fitted through an opening of the load beam to oppose the top surface of the load beam (i.e. the surface opposite the side of the load beam to which the flexure is mounted). Although the Prentice et al. mechanism does not significantly change the weight or height of the overall suspension assembly, it does require special manufacturing and assembly steps. To assemble the flexure to the load beam, the tab would likely first be moved through the opening in the load beam and then the flexure would likely be longitudinally shifted relative to the load beam to its mounting position. Moreover, the tab formation comprises multiple bends, the degree of each bend being important in the definition of the spacing between the tab and the top surface of the load beam. By the Prentice et al. design, errors in the formation of even one bend, including manufacturing tolerances, may affect the ultimate spacing of the limiter mechanism.

Another motion limiter is disclosed in U.S. Pat. No. 5,526,205 to Aoyagi et al. The Aoyagi reference discloses a head suspension having a perpendicular hook at an end of a flexure. The hook is shaped to engage a transverse appendage at the distal end of a load beam to prevent the end of the flexure from displacing vertically too great a distance from the load beam. Such a limiter mechanism, however, does not take into account the dynamic performance of the flexure, including excessive pitch and roll motions that can cause permanent deformation of head suspension components, but instead only limits vertical flexure motion caused by a shock load. In addition, because the single hook engages a transverse appendage on the load beam, the limiter mechanism may induce a roll bias when performing its limiting function.

In view of the shortcomings described above, a need exists for an improved flexure limiter in a head suspension. A limiter mechanism that provides for a limited range of movement for a head suspension flexure while also preventing the flexure from being pulled away from the load point dimple of the head suspension is particularly desirable.

SUMMARY OF THE INVENTION

The present invention is a head suspension for supporting a head slider over a disk surface in a rigid disk drive. The head suspension comprises a load beam and a flexure. The load beam includes a load portion at a distal end of the load beam, and the flexure includes a gimbal portion that pitches and rolls about a transverse and a longitudinal axis of the head suspension. The head suspension further includes a limiter for limiting the vertical displacement of the flexure, as can occur through deflections caused by a shock load or through excessive pitch and roll motion of the flexure. The limiter comprises an engagement tab and a limit element that operatively receives the engagement tab. The limit element includes an engagement surface, and the engagement tab includes a stop surface that is spaced apart from the engagement surface by a gap. In a first embodiment, the limit element extends from the load portion of the load beam, and the engagement tab extends from the gimbal region of the flexure. The limit element is connected to the load portion by a longitudinal bend of about 90 degrees. The limit element includes a perpendicular portion that extends from the longitudinal bend in a direction substantially perpendicular to the load portion of the load beam, and a parallel portion that extends from the perpendicular portion in a direction substantially parallel to a longitudinal axis of the head suspension. The engagement surface is provided on this parallel portion for contacting the stop surface of the engagement tab.

In a second embodiment, the limit element extends from and is connected to the load portion of the load beam by first and second longitudinal bends of about 90 degrees. he limit element includes a first perpendicular portion extending from the first longitudinal end and a second perpendicular portion extending from the second longitudinal bend. A ross piece is connected to both the first and second perpendicular portions, and the ngagement surface is provided on the cross piece for contacting the stop surface of the ngagement tab.

DETAILED DESCRIPTION OF THE PREFERRED EMBODIMENTS

Figure 1:
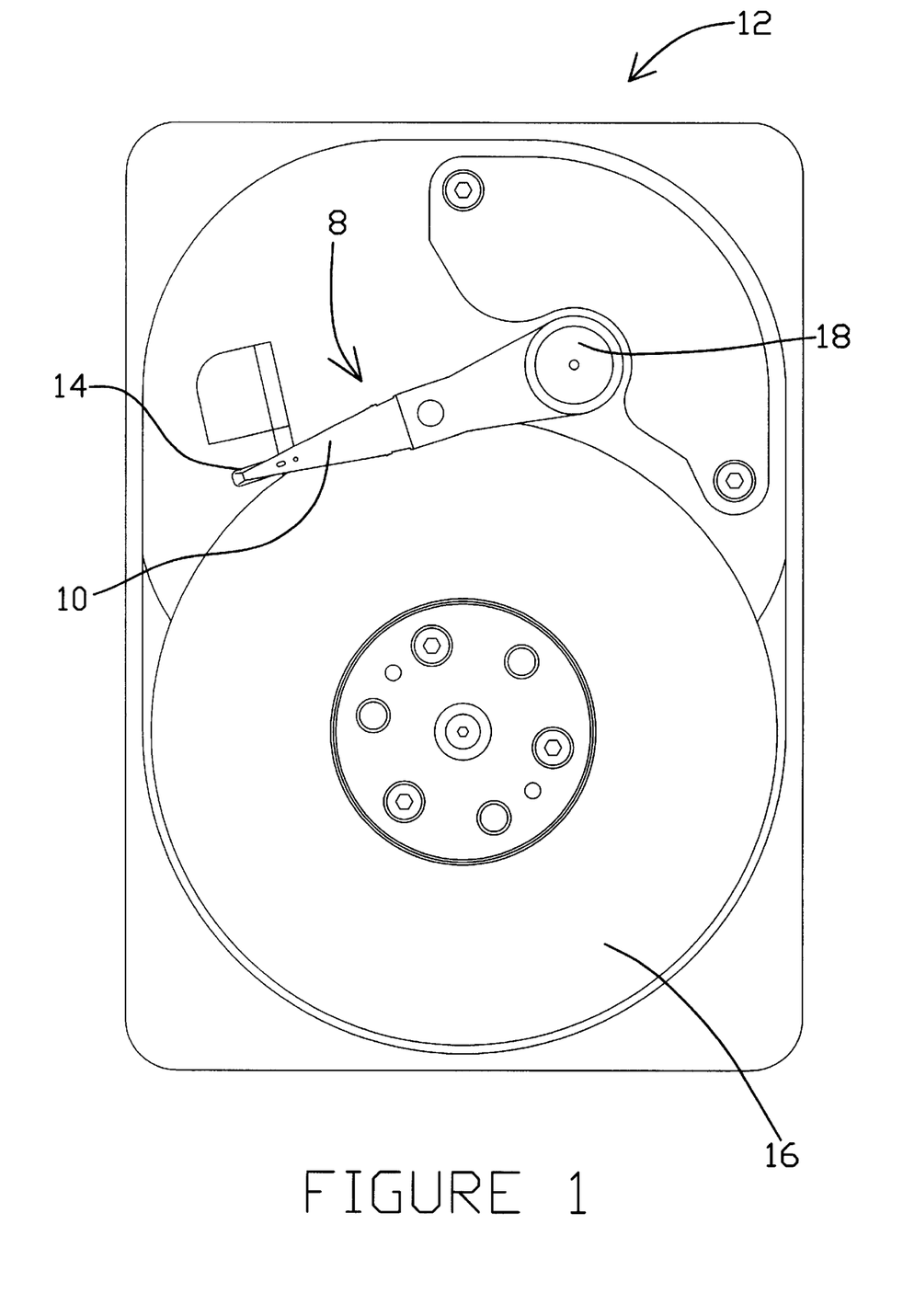
FIG. 1 is a plan view of a rigid disk drive including a head suspension in accordance with the present invention.

FIG. 1 illustrates a rigid disk drive 12 that includes a head suspension assembly 8. Head suspension assembly 8 resiliently supports a head slider 14 at a fly height above a rigid disk 16 during operation, as described above in the Background section. Head suspension assembly 8 is connected to a rotary actuator 18, as is known, for accessing data tracks provided on the surface of rigid disk 16. Head suspension assembly 10 could otherwise be utilized with a linear type actuator, as also well known.

Figure 2:
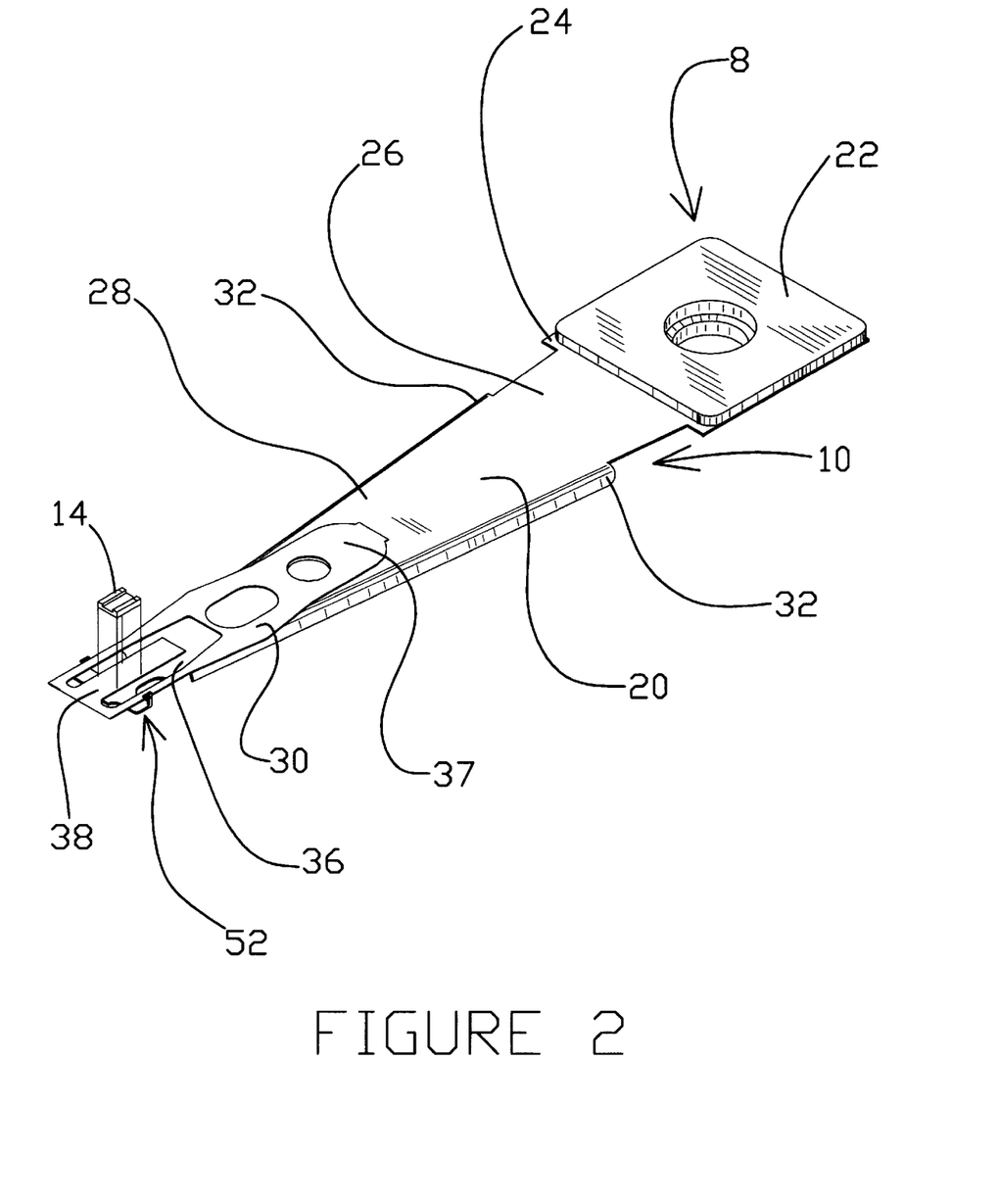
FIG. 2 is an isometric view of a head suspension assembly having a motion limiter in accordance with the present invention.

FIG. 2 shows head suspension assembly 8 in greater detail. Head suspension assembly 8 comprises head suspension 10 in accordance with the present invention, slider 14, and a base plate 22. Head suspension 10 comprises a load beam 20 and a flexure 30. Base plate 22 can be conventionally fixed to an actuator mounting region 24 of the load beam 20, such as by welding. The load beam 20 has a rigid region 28 and a spring region 26 between the mounting region 24 and rigid region 28. The spring region 26 typically includes a bend or radius, and provides a load to the rigid region 28 with respect to mounting region 24. Rigid region 28 is provided with stiffening rails 32, as are well known, to enhance stiffness properties.

Figure 3:
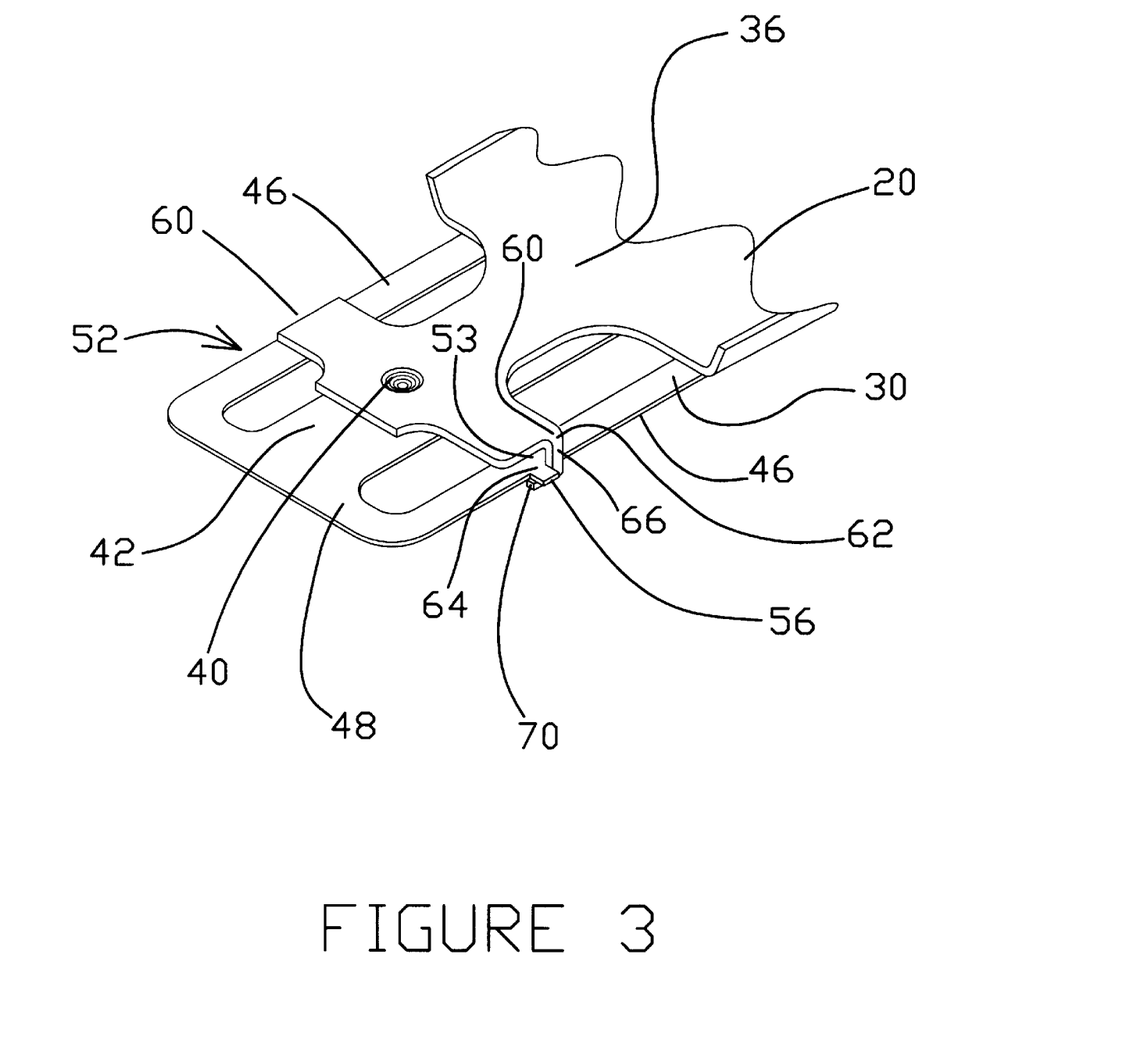
FIG. 3 is an isometric view of a portion of the head suspension of FIG. 2 showing the motion limiter in greater detail.
Figure 4:
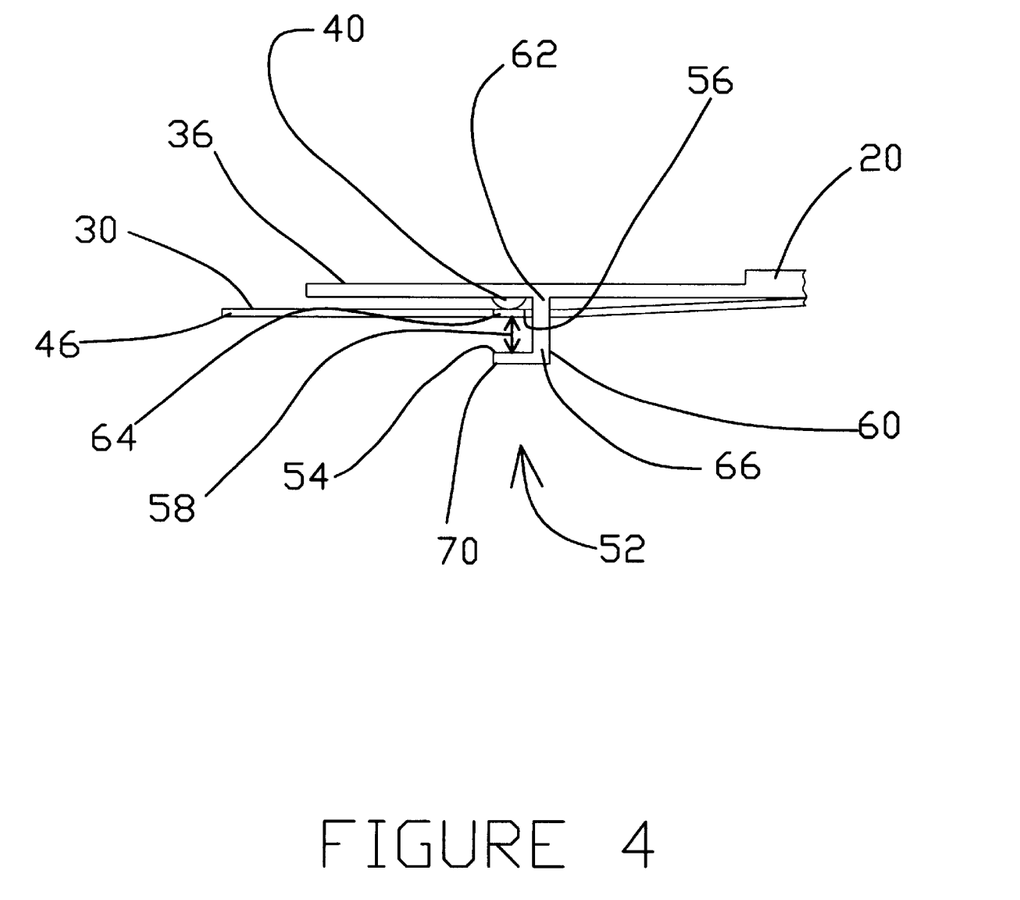
FIG. 4 is a side view of a portion of the head suspension of FIG. 2 showing the motion limiter in greater detail.

In the embodiment shown in FIGS. 2–5, the flexure 30 extends from the distal end of load beam 20, and is constructed as a separate element of head suspension 10. Flexure 30 comprises a load beam mounting region 37 and a gimbal region 38. The flexure 30 is secured to load beam 20 in a conventional manner, such as by welding load beam mounting region 37 to the rigid region 28 of the load beam 20. Rigid region 28 of load beam 20 includes a load portion 36 at its distal end. A dimple 40 is shown in FIGS. 3 and 4 extending from the load portion 36 of the load beam 20 toward gimbal region 38 to transfer the load from load portion 36 to the gimbal region 38 of the flexure 30. Dimple 40 also permits pitch and roll movements of the gimbal region 38. Dimple 40 can alternatively be formed in gimbal region 38 to extend toward load portion 36 of load beam 20. Dimple 40 can be formed by conventional methods, such as by using a forming punch. Structure other than a dimple can of course be used to provide a load transfer point and a gimbal point, including an etched tower, a glass ball, or an epoxy dome.

Figure 5:
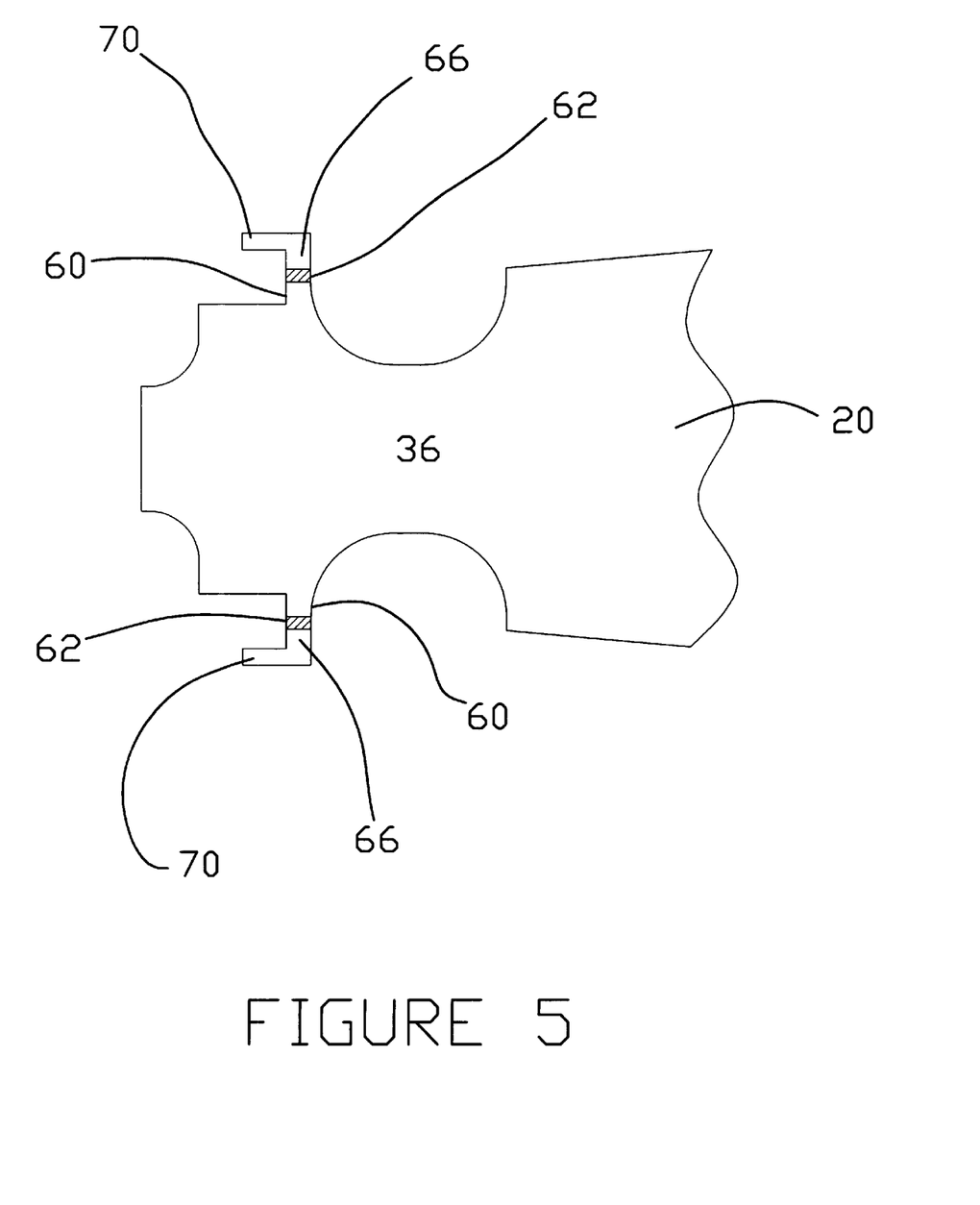
FIG. 5 is a plan view of a portion of the load beam of the suspension of FIG. 2 prior to any bending or forming of the motion limiter.

As perhaps best shown in FIGS. 3–5, a pair of outer arms 46 extend from the load beam mounting region 37 of flexure 30 and are joined by a cross-piece 48 at the ends of outer arms 46. A cantilever beam 42 extends from cross-piece 48 toward the mounting region 37, and is positioned between outer arms 46. Cantilever beam 42 provides a slider mounting surface to which the slider 14 is attached, such as by adhesives or the like. Cross-piece 48 can be provided with offset bends (not shown) to space cantilever beam 42 from the load portion 36 of load beam 20 by approximately the height of dimple 40.

Head suspension 10 includes a motion limiter 52 that is adapted to limit movement of the flexure 30 relative to the load beam 20. In the first embodiment shown in FIGS. 3–5, motion limiter 52 includes a pair of limit elements 60 that are generally L-shaped and that laterally extend from the sides of load portion 36 of load beam 20, and a pair of engagement tabs 64 that laterally extend from the outer arms 46 of flexure 30. The limit elements 60 include tab receiving openings 53, and limit elements 60 are bent during a load beam forming step along longitudinal bends 62 at an angle of about 90°. In this manner, each tab receiving opening 53 operatively receives one of the tabs 64 that transversely extends from the outer arms 46 of flexure 30. As perhaps best shown in FIG. 5, limit elements 60 can be partially etched at the location of longitudinal bends 62 to facilitate this forming process. In a preferred embodiment, limit elements 60 are symmetric about dimple 40 so that limit elements 60 and tabs 64 are aligned substantially linearly with load point dimple 40 along a generally transverse axis of head suspension 10. With this construction, the vertical displacement of tabs 64 caused by normal pitch motion is minimized. Other constructions can of course be used, including embodiments where the limit elements 60 are not symmetric about dimple 40 or are aligned along a transverse axis of head suspension 10 that does not intersect dimple 40 (i.e. the limit elements are positioned proximally or distally of the position of dimple 40).

More particularly, limit elements 60 each include a perpendicular portion 66, a parallel portion 70, and an engagement surface 54. The perpendicular portion 66 is connected to the longitudinal bend 62, and extends away from load portion 36 in a direction substantially perpendicular to load portion 36. Parallel portion 70 is attached to the perpendicular portion 66 in such a manner that parallel portion 70 extends in a direction substantially parallel to a longitudinal axis of head suspension 10. Engagement surface 54 is provided on parallel portion 70 of limit element 60, and extends beneath and opposes a stop surface 56 of tab 64. Engagement surface 54 of limit elements 60 and stop surface 56 of tabs 64 are separated by a gap 58.

The stop surface 56 of tabs 64 together with the engagement surface 54 of limit elements 60 provide the limiting function of the present invention. Specifically, if outer arms 46 of flexure 30, and thus consequently tabs 64, are moved the distance of the gap 58, as when the disk drive is subjected to a shock load, or when flexure 30 of head suspension 10 pitches or rolls by an excessive amount, at least one of the engagement surfaces 54 will contact at least one of the stop surfaces 56 of tabs 64. For example, when flexure 30 experiences a shock load that vertically displaces tabs 64 by an amount greater than the gap 58, both of the engagement surfaces 54 contact the corresponding stop surface 56, while only one of the engagement surfaces 54 will contact one of the stop surfaces 56 when flexure 30 rolls by an amount that causes one of the tabs 64 to displace by an amount greater than the gap 58. In an embodiment where limit elements 60 and tabs 64 are not substantially aligned along a transverse axis with load point dimple 40 (not shown), tabs 64 of flexure 30 may be vertically displaced by an amount greater than gap 58 through excessive pitch motion of flexure 30, which will cause both of the engagement surfaces 54 to contact the corresponding stop surface 56. In this manner, motion limiter 52 prevents further movement of flexure 30. Permanent yielding of any part of flexure 30, specifically including cantilever beam 38, crosspiece 48, and outer arms 46, and contact between rigid disk 16 and head slider 14 in this manner are prevented.

It is an important aspect of the present invention that the limit elements 60 can be provided so as to define the gap 58 with the required precision yet still be efficiently manufactured. The limit elements 60 are preferably formed by an etching process, as noted 15 above, to laterally extend from the load portion 36 of load beam 20. The size of the gap 58 is thus defined by the distance between the engagement surface 54 of each limit element 60 and the bend 62 about which the limit elements 60 are to be bent by about 90°. Since the bending operation is an independent forming operation from the etching process, the gap 58 can be defined by selecting the location for bend 62 based upon the etched engagement surfaces 54, or by selecting the location of the etched engagement surfaces 54 based upon a given bend location. Because etching is a very precise process, the gap 58 can be exactly defined from the bend 62. The bending operation to form the limit elements 60 is less critical. That is, although the location of the bend 62 is important, the angle of the bend is significantly less critical. In bending operations, manufacturing tolerances within the angle of bend are more difficult to control, particularly, where the part formed, such as load beam 20, comprises a spring metal. A degree of spring back must be compensated for. However, by the present construction and method of making, the manufacturing tolerances of the bend angle forming operation, including potential springback have very little affect on the ultimate gap 58.

Thus, the limit elements 60 can be bent in position, as shown in FIG. 3, from the FIG. 5 position by a simple forming punch or die (not shown). Such a conventional forming punch or die can accurately position the points of bend 62 by bending the motion limiters 52 over the edge of a forming block (not shown).

Motion limiter 52 of head suspension 10 provides many advantages over previous limiter mechanisms. The linear alignment of the tabs 64 and the limit elements 60 with dimple 40 along a transverse axis of head suspension 10 prevents permanent yielding of the flexure 30 and the load beam 20 in a region surrounding the motion limiter 52 since limiter 52 prevents movement of tabs 64 beyond the distance of gap 58. Because dimple 40 transfers the load to the gimbal region 38 and serves as a point about which gimbal region 38 of flexure 30 can pitch and roll, preventing permanent deformation in the region surrounding dimple 40 is desirable. In addition, aligning the components of the motion limiter 52 with dimple 40 better prevents the flexure 30 from being pulled away from the dimple 40 since the limiting function is provided at a point near dimple 40. This is advantageous in that flexure 30 is better able to function while contact is maintained between gimbal region 38 and dimple 40. Moreover, because limit elements 60 are symmetric about dimple 40, motion limiter 52 will not induce a roll bias when flexure 30 pitches by an amount that exceeds gap 58.

Figure 6:
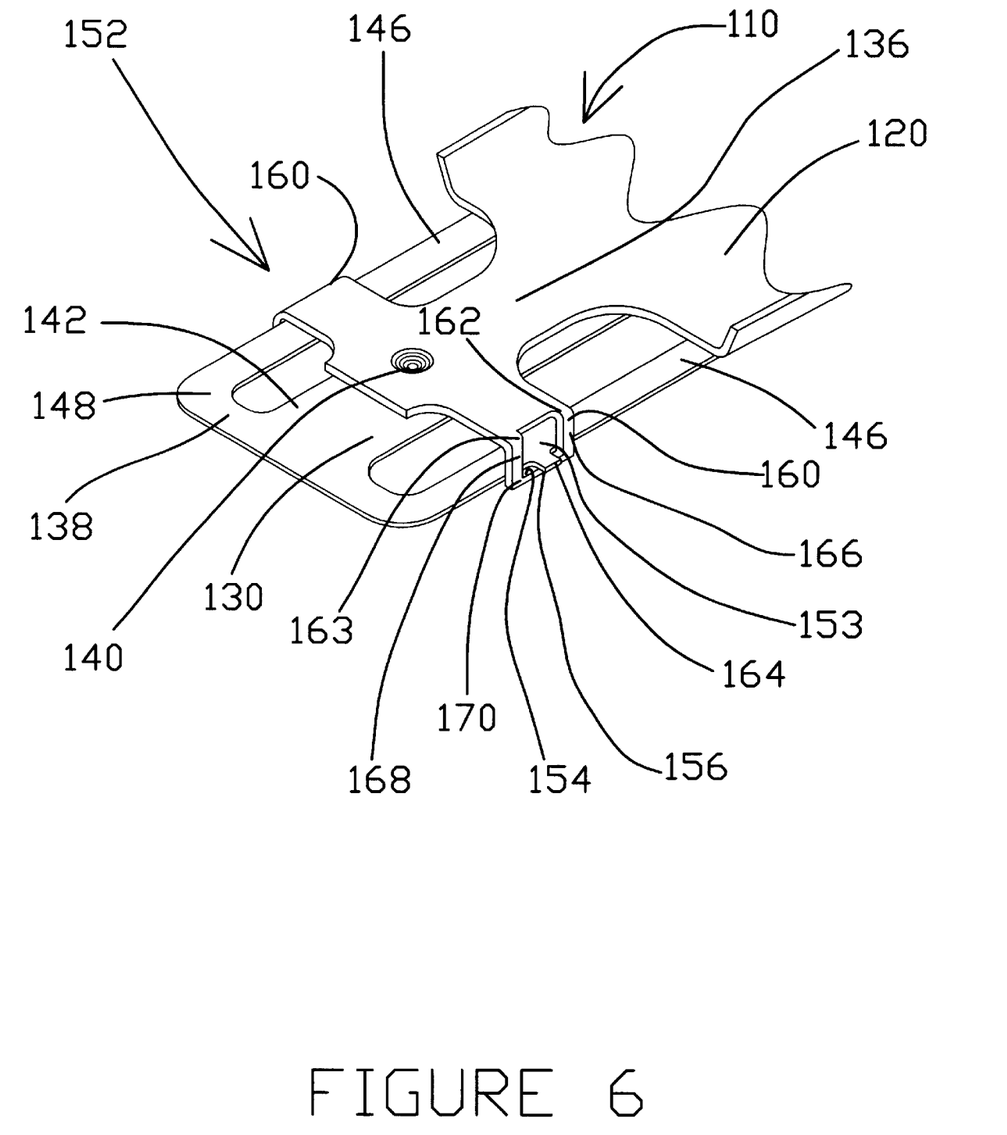
FIG. 6 is an isometric view of a portion of a second embodiment of a head suspension having a motion limiter in accordance with the present invention.
Figure 7:
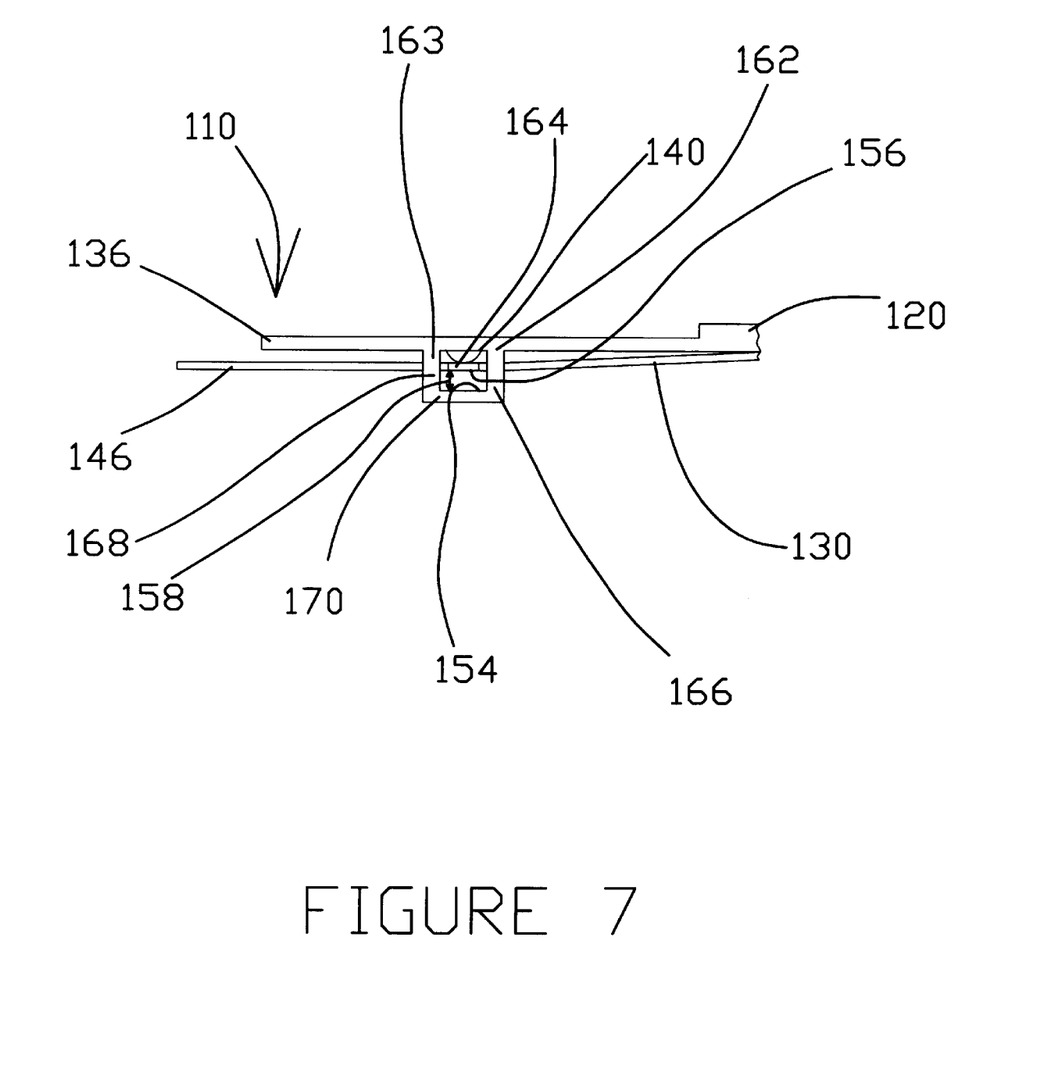
FIG. 7 is a side view of the portion of the head suspension of FIG. 6 showing the motion limiter.
Figure 8:
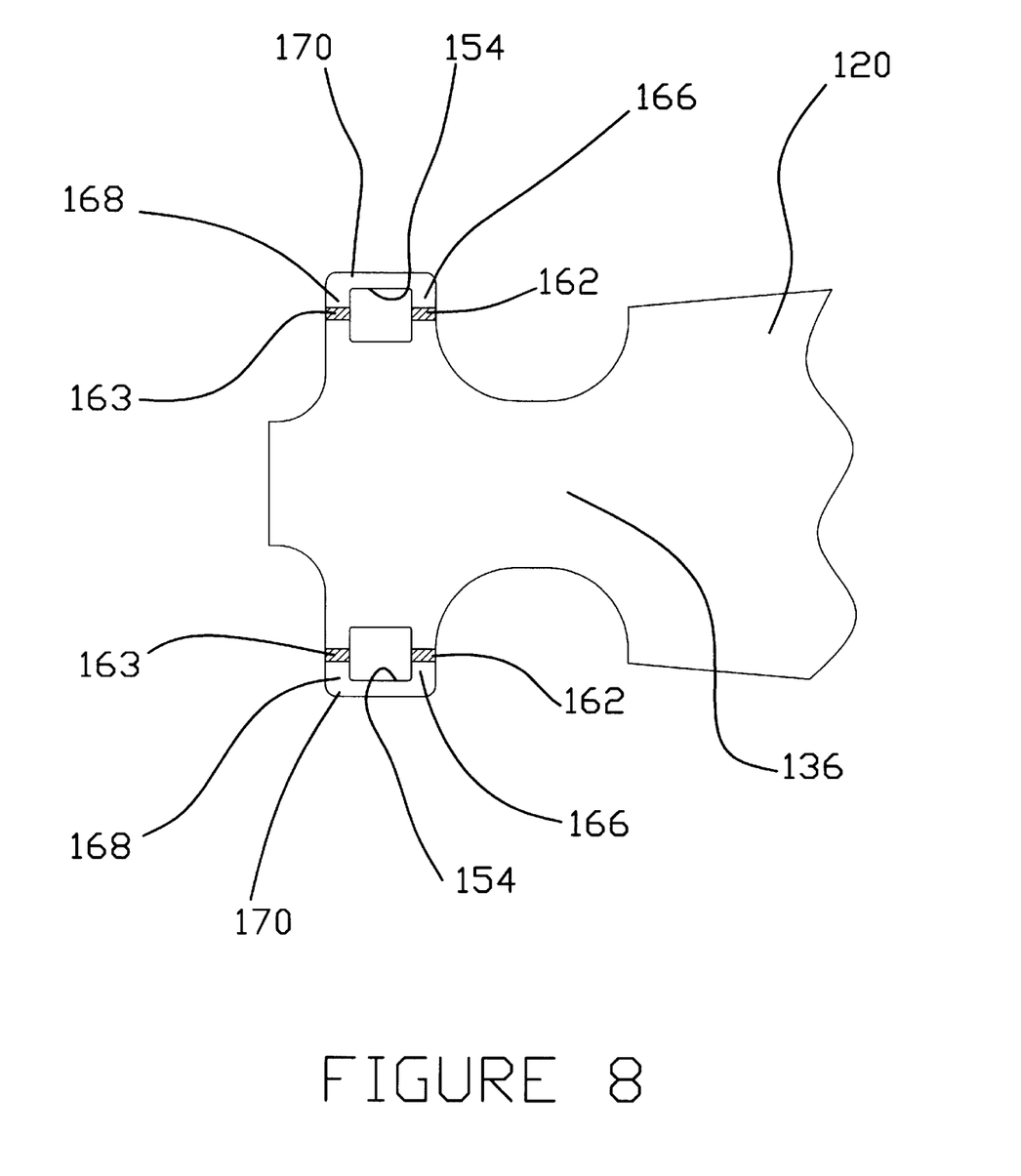
FIG. 8 is a plan view of the load beam of the head suspension of FIG. 6 prior to any bending or forming operations of the motion limiter.

Referring now to FIGS. 6–8, a second embodiment 110 of a head suspension in accordance with the present invention is shown. Head suspension 110 includes a load beam 120 and a flexure 130 at a distal end of load beam 120. Flexure 130 is again constructed as a separate element of head suspension 110, and is secured to load beam 120 in a conventional manner, such as by welding. Load beam 120 includes a load portion 136 at its distal end for transferring a load to gimbal region 138 of flexure 130, as is known. A dimple 140 is shown from its concave side extending from the load portion 136 of the load beam 120 toward gimbal region 138, and provides a specific manner by which the load is transferred from load portion 136 to the gimbal region 138 of the flexure 130. Dimple 140 further permits pitch and roll movements of the gimbal region 138, as conventionally known. Gimbal region 138 of flexure 130 includes a cantilever beam 142, a pair of outer arms 146, and a cross-piece 148, which is integral with cantilever beam 142 and outer arms 146.

Head suspension 110 includes a motion limiter 152 that is adapted to limit movement of flexure 130 relative to load beam 120. Motion limiter 152 includes a pair of limit elements 160 that laterally extend from the sides of load portion 136 of load beam 120, and a pair of engagement tabs 164 that extend from outer arms 146 of flexure 130. Each limit element 160 is bent at first and second longitudinal bends 162 and 163, respectively, at an angle of about 90°. Limit elements 160 include a first perpendicular portion 166 connected to first longitudinal bend 162, and a second perpendicular portion 168 connected to second longitudinal bend 163. First perpendicular portion 166 is connected to first longitudinal bend 162 and second perpendicular portion 168 is connected to second longitudinal bend 163 in such a manner that portions 166 and 168 extend from the respective longitudinal bends in a direction substantially perpendicular to load portion 136. A cross piece 170 is connected to first perpendicular portion 166 and second perpendicular portion 168, and extends in a direction substantially parallel to a longitudinal axis of head suspension 110. In this manner, first perpendicular portion 166, second perpendicular portion 168, and cross piece 170 define a tab receiving opening 153 that operatively receives tab 164.

An engagement surface 154 is provided on cross piece 170, and extends beneath and opposes a stop surface 156 of tab 164. Engagement surface 154 of limit elements 160 and stop surface 156 of tabs 164 are separated by a gap 158. The stop surface 156 of tabs 164 together with the engagement surface 154 of limit elements 160 provide the limiting function of the present invention in a manner similar to that described above with respect to head suspension 10. Specifically, at least one engagement surface 154 of limit elements 160 contacts a stop surface 156 of tabs 164 when flexure 130 pitches or rolls by an amount that displaces tabs 164 on outer arms 146 the distance of the gap 158. In this manner, permanent yielding of any part of flexure 130 and damaging contact between a disk surface and a head slider attached to head suspension 110 are prevented. In addition, motion limiter 152 prevents tabs 164 from longitudinal motion relative to load beam 120 since second perpendicular portion 168 will contact tab 164 should flexure 130 be longitudinally displaced.

As with head suspension 10 described above, the limit elements 160 are preferably formed by an etching process to laterally extend from the load portion 136 of load beam 120. By this construction, the size of the gap 158 is defined by the distance between the engagement surface 154 of each limit element 160 and the first and second bends 162 and 163, respectively. Because etching is a very precise process, the gap 158 can be exactly defined from bends 162 and 163.

Although the present invention has been described with reference to preferred embodiments, those skilled in the art will recognize that changes may be made in form and detail without departing from the spirit and scope of the invention.

What is claimed is:

1. A head suspension for supporting a head slider over a disk surface in a rigid disk drive, comprising:

a load beam having a load portion at a distal end of the load beam;

a flexure at the distal end of the load beam, the flexure comprising a gimbal region having at least one longitudinal arm with a connection to a cantilever beam, the cantilever beam providing a head slider mounting surface, the gimbal region adapted for pitch and roll motion about transverse and longitudinal axes of the head suspension; and a limiter for limiting vertical displacement of the flexure, the limiter comprising an engagement tab and a limit element that operatively receives the engagement tab, with one of the engagement tab and the limit element provided at a location longitudinally offset from the connection between the longitudinal arm and the cantilever beam, and adjacent to the head slider mounting surface and the other of the engagement tab and the limit element provided at the load portion of the load beam, the tab and the limit element cooperating to limit motion of the flexure with respect to the load portion of the load beam.

2. The head suspension of claim 1, wherein:

the limit element includes an engagement surface; and the engagement tab includes a stop surface that is spaced apart from the engagement surface of the limit element by a gap, the engagement surface contacting the stop surface as the flexure is displaced by an amount greater than the gap to limit motion of the flexure with respect to the load beam.

3. The head suspension of claim 2, wherein the limit element extends from the load portion of the load beam, and the engagement tab extends transversely from the at least one longitudinal arm of the gimbal region of the flexure.

4. The head suspension of claim 3, wherein:

the head suspension includes a dimple that extends from one of the load portion of the load beam and the gimbal region of the flexure and contacts the other of the load portion of the load beam and the gimbal region of the flexure; and the limit element and the engagement tab are aligned substantially linearly with the dimple along a transverse axis of the head suspension.

5. The head suspension of claim 3, wherein the gimbal region of the flexure comprises:

a cantilever beam having a free end;

two longitudinal arms extending from a load beam mounting region of the flexure and adjacent the cantilever beam, the engagement tab extending transversely from one of the longitudinal arms of the flexure; and a cross piece integral with the cantilever beam and the longitudinal arms.

6. The head suspension of claim 5, wherein the limit element is connected to the load portion of the load beam by a longitudinal bend of about 90 degrees.

7. The head suspension of claim 6, wherein the limit element is L-shaped and comprises:

a perpendicular portion having a first end connected to the longitudinal bend and extending from the longitudinal bend in a direction substantially perpendicular to the load portion of load beam; and a parallel portion connected to a second end opposite the first end of the perpendicular portion and extending from the perpendicular portion in a direction parallel to a longitudinal axis of the head suspension, the engagement surface of the limit element being provided on the parallel portion.

8. The head suspension of claim 6, wherein the limit element is partially etched at the location of the longitudinal bend.

9. The head suspension of claim 5, wherein the limit element is connected to the load portion of the load beam by first and second longitudinal bends of about 90 degrees, the first and second longitudinal bends being longitudinally spaced apart from each other.

10. The head suspension of claim 9, wherein the limit element comprises:

a first perpendicular portion having a first end connected to the first longitudinal bend and extending from the first longitudinal bend in a direction perpendicular to the load portion of the load beam;

a second perpendicular portion having a first end connected to the second longitudinal bend and extending from the second longitudinal bend in a direction perpendicular to the load portion of the load beam; and a cross-piece connected to the first perpendicular portion and the second perpendicular portion, the engagement surface of the limit element being provided on the cross-piece, the first perpendicular portion, the second perpendicular portion, and the cross-piece defining an opening in the limit element that operatively receives the engagement tab to limit movement of the flexure.

11. The head suspension of claim 9, wherein the limit element is partially etched at the location of the first and second longitudinal bends.

12. The head suspension of claim 2, wherein the limiter comprises at least two limit elements and engagement tabs, each limit element having an engagement surface and each engagement tab having a stop surface, the engagement surface of each limit element spaced apart from a corresponding stop surface of an engagement tab by the gap.

13. In a head suspension for supporting a head slider over a disk surface within a rigid disk drive, the head suspension of the type including a load beam having a load portion at a distal end of the load beam, a flexure having a gimbal portion having a pair of longitudinal arms with a connection to a cantilever beam, the cantilever beam providing a head slider mounting surface, a motion limiter for limiting the movement of the flexure relative to the load beam, comprising:

a pair of limit elements integral with the load portion of the load beam, each of the limit elements connected to the load portion by a first longitudinal bend of about 90 degrees and having an engagement surface; and a pair of engagement tabs extending from the longitudinal arm at a location longitudinally offset from the connection between the longitudinal arm and the cantilever beam, and adjacent to the head slider mounting surface, each of the engagement tabs including a stop surface that is spaced apart from the engagement surface of a corresponding one of the limit elements by a gap, the stop surface being engaged by the engagement surface when the flexure is displaced from the load beam by an amount equal to the gap to limit the motion of the flexure.

14. The motion limiter of claim 13, wherein the pair of limit elements and the pair of engagement tabs are aligned substantially linearly along a transverse axis of the head suspension.

15. The motion limiter of claim 14, wherein the limit element comprises:

a perpendicular portion having a first end connected to the first longitudinal bend and extending from the longitudinal bend in a direction substantially perpendicular to the load portion of load beam; and a parallel portion connected to a second end opposite the first end of the perpendicular portion and extending from the perpendicular portion in a direction parallel to a longitudinal axis of the head suspension, the engagement surface of the limit element being provided on the parallel portion.

16. The motion limiter of claim 14, wherein the limit element is connected to the load portion of the load beam by a second longitudinal bend of about 90 degrees, the limit element comprising:

a first perpendicular portion having a first end connected to the first longitudinal bend and extending from the first longitudinal bend in a direction perpendicular to the load portion of the load beam;

a second perpendicular portion having a first end connected to the second longitudinal bend and extending from the second longitudinal bend in a direction perpendicular to the load portion of the load beam; and a cross-piece connected to the first perpendicular portion and the second perpendicular portion, the engagement surface of the limit element being provided on the cross-piece, the first perpendicular portion, the second perpendicular portion, and the cross-piece defining an opening in the limit element that operatively receives the engagement tab to limit movement of the flexure.

17. A head suspension for supporting a head slider over a disk surface in a rigid disk drive, comprising:

a load beam having a load portion at a distal end of the load beam;

a flexure at the distal end of the load beam, the flexure comprising a gimbal region having at least one longitudinal arm with a connection to a cantilever beam, the cantilever beam providing a head slider mounting surface, the gimbal region adapted for pitch and roll motion about transverse and longitudinal axes of the head suspension;

a limiter for limiting vertical displacement of the flexure, the limiter comprising an engagement tab and a limit element that operatively receives the engagement tab, with the engagement tab and the limit element provided at a location longitudinally offset from the connection between the longitudinal arm and the cantilever beam, and adjacent to the head slider mounting surface, the limit element being connected to the load portion of the load beam by a perpendicular portion having a first end connected to the first longitudinal bend and extending from the longitudinal bend in a direction substantially perpendicular to the load portion of load beam and a parallel portion connected to a second end opposite the first end of the perpendicular portion and extending from the perpendicular portion in a direction parallel to a longitudinal axis of the head suspension, an engagement surface of the limit element being provided on the parallel portion.

18. A head suspension for supporting a head slider over a disk surface in a rigid disk drive, comprising:

a load beam having a load portion at a distal end of the load beam;

a flexure at the distal end of the load beam, the flexure comprising a gimbal region having at least one longitudinal arm with a connection to a cantilever beam, the cantilever beam providing a head slider mounting surface, the gimbal region adapted for pitch and roll motion about transverse and longitudinal axes of the head suspension;

a limiter for limiting vertical displacement of the flexure, the limiter comprising an engagement tab and a limit element that operatively receives the engagement tab, with the engagement tab and the limit element provided at a location offset from the connection between the longitudinal arm and the cantilever beam, and adjacent to the head slider mounting surface, the limit element being connected to the load portion of the load beam by first and second longitudinal bends spaced apart from each other, the limiter elements comprising;

a first perpendicular portion having a first end connected to the first longitudinal bend and extending from the first longitudinal bend in a direction perpendicular to the load portion of the load beam;

a second perpendicular portion having a first end connected to the second longitudinal bend and extending from the second longitudinal bend in a direction perpendicular to the load portion of the load beam; and a cross-piece connected to the first perpendicular portion and the second perpendicular portion, an engagement surface of the limit element being provided on the cross-piece, the first perpendicular portion, the second perpendicular portion, and the cross-piece defining an opening in the limit element that operatively receives the engagement tab to limit movement of the flexure with respect to the load portion of the load beam.

* * * * *